MULTIPLE FREQUENCY DATA HANDLING SYSTEM

Filed Sept. 13, 1966 7 Sheets-Sheet 1

FIG. 3
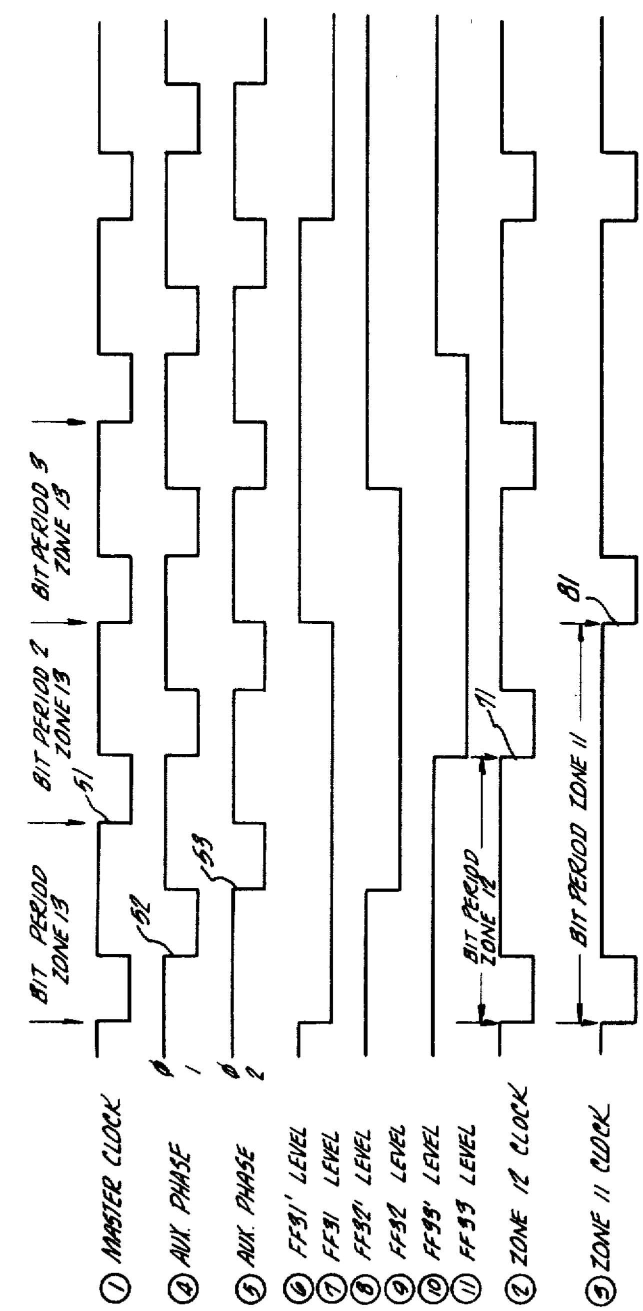
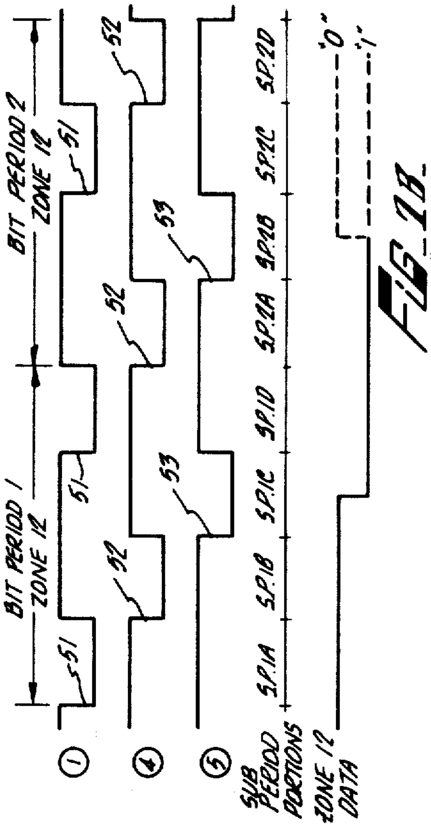
FIG. 7B
FIG. 7A
| PULSE TRAIN | I85 | I86 | I87 | I88 |
|---|---|---|---|---|
| ① | FALSE | TRUE | TRUE | TRUE |
| ④ | TRUE | FALSE | TRUE | TRUE |
| ⑤ | TRUE | TRUE | FALSE | TRUE |
| ① | TRUE | TRUE | TRUE | FALSE |
INVENTORS.
RICHARD C. SIMENSEN
NORMAN S. BLESSUM
BY JOHN A. HIBNER
Christie, Parker & Hale
ATTORNEYS.

INVENTORS.
RICHARD C. SIMONSEN
NORMAN S. BLESSUM
JOHN A. HIBNER
BY Christie, Parker & Hale
ATTORNEYS.

INVENTORS
RICHARD S. SIMONSEN
NORMAN S. BLESSUM
BY JOHN A. HIBNER
Christie, Parker & Hale
ATTORNEYS.

INVENTOR.
RICHARD C. SIMONSEN
NORMAN S. BLESSUM
BY JOHN A. HIBNER
Christie, Parker & Hale
ATTORNEYS

| INPUT TRAIN | 185 | 186 | 187 |
|---|---|---|---|
| ① (51) | FALSE | TRUE | TRUE |
| ④ (52) | TRUE | FALSE | TRUE |
| ⑥ (53) | TRUE | TRUE | FALSE |

INVENTORS.
RICHARD C. SIMONSEN
NORMAN S. BLESSUM
BY JOHN A. HIBNER
Christie, Parker & Hale
ATTORNEYS.

Dec. 17, 1968 R. C. SIMONSEN ET AL 3,417,378

MULTIPLE FREQUENCY DATA HANDLING SYSTEM

Filed Sept. 13, 1966 7 Sheets-Sheet 7

INVENTORS.
RICHARD S. SIMONSEN
NORMAN S. BLESSUM
JOHN A. HUBNER

BY Christie, Parker & Hale
ATTORNEYS.

United States Patent Office 3,417,378
Patented Dec. 17, 1968

3,417,378
MULTIPLE FREQUENCY DATA HANDLING SYSTEM

Richard C. Simonsen, South Pasadena, Norman S. Blessum, Covina, and John A. Hibner, Sierra Madre, Calif., assignors to Burroughs Corporation, Detroit, Mich., a corporation of Michigan
Filed Sept. 13, 1966, Ser. No. 579,119
16 Claims. (Cl. 340—172.5)

This invention relates in general to timing systems and, more particularly, relates to systems for timing storage and recovery of data of multiple frequency rates utilizing a single frequency clock signal.

A magnetic disk file is described in an application entitled "Information Address Recording and Retrieving System," filed on Sept. 3, 1963, having Ser. No. 306,365, now abandoned, and assigned to the same assignee as the present application. In the referenced application a continuation of which issued on March 26, 1968, and given Patent No. 3,375,507, magnetic disks each having three separate information zones are described, wherein different data frequencies are utilized from one zone to the next in order to allow more efficient data handling. If data, for example, is stored on the disk in the form of binary bits, all bit locations in one zone have the same predetermined period and frequency of repetition. Each zone, however, is assigned a frequency and period different from the other zones. The data zones of the storage disks in the referenced patent application have a data frequency rate with a fixed ratio which decreases from the outermost data zone on the disk to the innermost data zone.

In the past, separate clock tracks for each zone have been required. These separate clock tracks consume valuable data storage space, and more data storage space is available if the number of clock tracks is kept at a minimum. In addition, of course, multiple clock tracks in a head-per-track system require extra read and write heads and extra associated circuitry such as amplifier circuits, head and amplifier selection circuits and other associated electronics. This extra electronic equipment decreases the efficiency and increases the cost and complexity of such prior art systems.

In accordance with the principles of this invention, the foregoing disadvantages of the prior art are avoided wherein a single clock track, having clock pulses recorded therein at the frequency of one of the data frequencies, is utilized to generate clocking signals for timing both storage and recovery of information stored at all of the different frequencies on the storage medium. The timing apparatus of this invention for controlling the flow of data relative to a magnetic storage medium comprises, a storage medium wherein data in the form of binary bits is stored in a plurality of distinct portions of said medium, each of said binary bits in each distinct portion has a predetermined period and frequency which is different from the predetermined period and frequency in at least one other portion of the other data storage portions, a master clock pulse train having a pulse occurrence frequency relative to at least one designated data frequency of said binary bits is stored on said medium, means for recovering said master clock pulse train from said medium, means for deriving from said master clock pulse train a plurality of auxiliary pulse trains, each auxiliary pulse train having a pulse occurrence frequency equal to the frequency of the master clock train and being shifted in time relative to each other by equal amounts to define sub-period portions within a bit period at said one designated frequency, means utilizing said master clock pulse train for clocking data of said one designated frequency to and from said medium, and means sequencing selected pulses from said master clock pulse train with selected pulses from said auxiliary pulse trains for obtaining additional clock pulse trains each having a frequency appropriate for clocking data of said remaining frequencies to and from said medium.

In one embodiment of this invention, the storage medium is a magnetic disk file, although the invention is in no way limited to that type of storage medium for it is equally applicable to magnetic drums or magnetic tapes, as well as storage mediums other than those of the magnetic type. Considering the magnetic disk file utilized in describing this invention, information characters are stored in three data zones with each information character being divided into three groups of bits designated bytes with each byte of a character being stored in a separate zone on the disk. The bits of each byte are serially read from, and are serially written on, the zones during simultaneous operations occurring at different frequencies for each zone. In the reading and writing operation, the serial bits are shifted into or from shift registers associated with each zone. The transfer of bits between the zones of the disk and their respective shift registers occurs simultaneously under control of clock signals for each shift register. The clock signals for these shift registers are different for each zone although they are all derived from a master clock train which is recorded on the disk with the same frequency as the data frequency for one of the data zones.

In one embodiment of this invention a first byte associated with an outermost data zone of the disk may advantageously be made up of four bits; while a second byte associated with a middle storage zone may advantageously be made up of three bits; and a third byte associated with an innermost data zone may advantageously be made up of two bits. An entire character comprising all three bytes requires simultaneous transfer of these bytes relative to the magnetic disk. A clock track is recorded on the disk at the same frequency as the bit repetition rate for the outermost data zone, and means are available for recovering this clock track in the form of a train of clock pulses.

The foregoing described bytes, although read simultaneously from the disk at different frequencies, are, in addition, asynchronous relative to the master clock track on the disk. For example, such bytes are shifted relative to their original recorded location because of such factors as disk jitter, temperature changes, head skew and gap variation, and other unpredictable factors. In order to compensate for the asynchronous nature of the binary bits, a synchronizing bit is recorded immediately before each byte in each data zone, the clock pulses derived from the disk's clock track are applied to a timing circuit of this invention which responds to this single clock track and emits: a first recurring cycle of repetitive pulses appearing in sub-period intervals within a first period equal to the bit period of said first data zone, each same ordered sub-period interval repetitively appearing in each cycle defining a clocking pulse train of said bit frequency of said first zone; a second recurring cycle of repetitive pulses appearing in sub-period intervals within a second period equal to the bit period of said second zone, each same ordered sub-period interval repetitively appearing in each cycle defining a clocking pulse train of said bit frequency of said second zone, and a third recurring cycle of repetitive pulses appearing in sub-period intervals within a third period equal to the bit period of said third zone, each same ordered sub-period interval repetitively appearing in each cycle defining a clocking pulse train of said bit frequency of said third zone. Means are also provided to monitor concurrence of each of the synchronizing marks with one of the sub-period intervals in the three cycles in order to obtain three pulse clocking trains of appropriate frequency and in synchronism with the bits of bytes in all three zones.

The foregoing objects and features of this invention may more readily be understood by reference to the accompanying drawing in which:

FIG. 3 is a pulse wave form chart useful in promoting a clearer understanding of FIGS. 1 and 2;

FIGS. 6 and 7 are combined block and logic diagrams depicting a further alternative embodiment for the data reading strobe selection circuit of this invention; and FIGS. 6A, 7A, and 7B are tables and pulse wave forms useful in promoting a clearer understanding of FIGS. 6 and 7.

Figure 1:
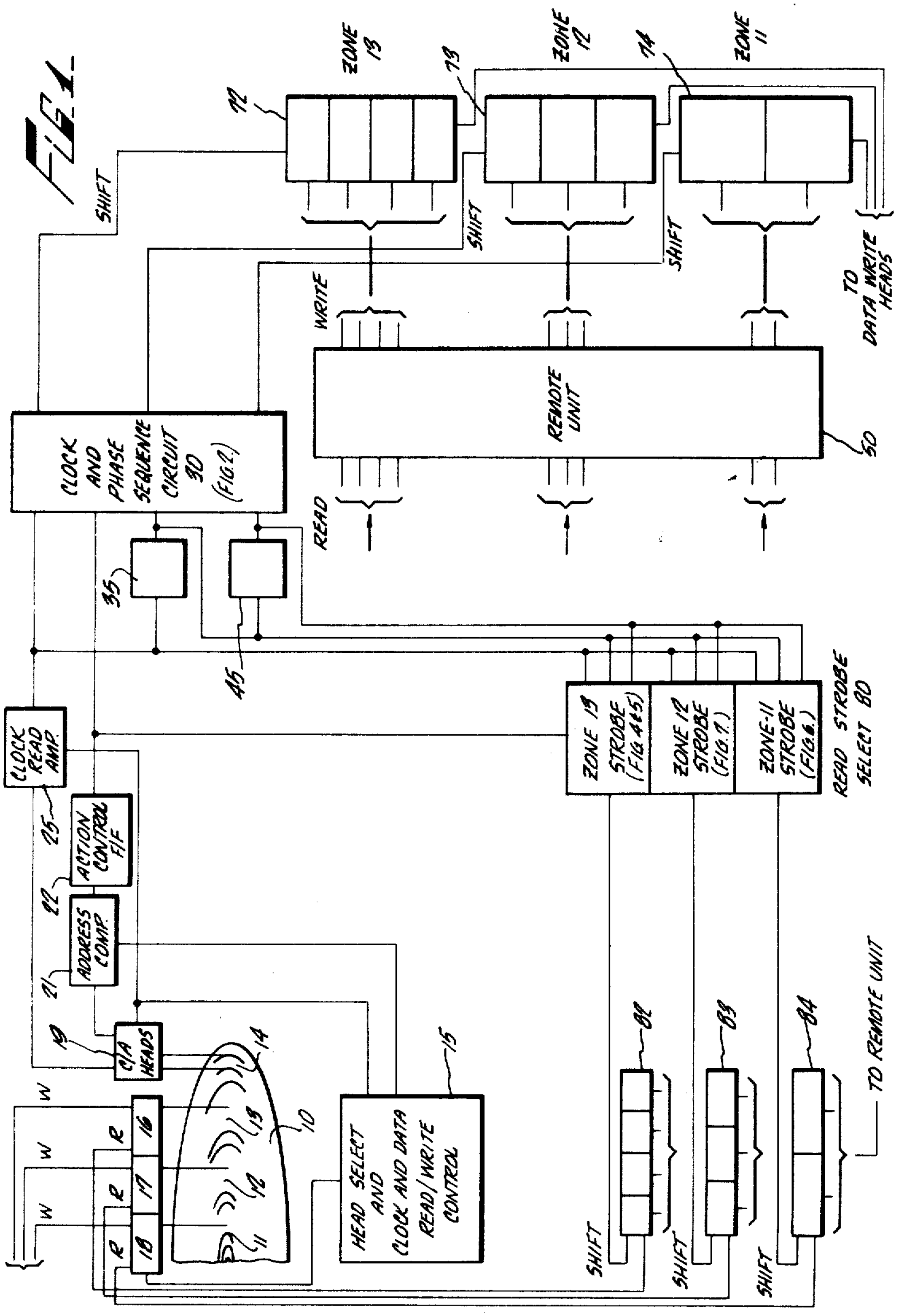
FIG. 1 is a block diagram of timing system for clocking data of multiple frequencies relative to a storage medium in accordance with the principles of this invention.

Turning now to FIG. 1, a magnetic storage device in the form of disk 10 is depicted having three different information storage zones 11, 12 and 13, respectively. Of course, other storage devices such as drums and other magnetic storage means as well as different numbers of storage frequencies are within the contemplation and teachings of this invention. A separate master clock and master address zone 14 is also provided. Information in binary bit form is stored in each of the three information, or data zones, 11 through 13 of disk 10. Higher storage capacity may be achieved by utilizing different frequtncies for the bit repetition rate in each of the three data zones 11 through 13. A period in a given zone includes one binary bit. As a typical example, the outermost data zone 13 may have the highest frequency of 2 megacycles. The middle zone 12 may have a mid-range frequency of 1½ megacycles, and the innermost data zone 11 may have the lowest frequency of 1 megacycle.

For this typical but not limiting example, the frequency ratio for the three different data zones is 4 to 3 to 2, respectively. Accordingly, for a given rotational movement of disk 10: four periods, or bit locations, will pass under the read-write heads 16 in zone 13; three periods, or bit locations, will pass under the read-write head 17 in zone 12; and two bit locations will pass under the read-write head 18 in zone 11. Clock track zone 14 has recorded therein a plurality of binary 1's which for this example are recorded at the highest information storage frequency of 2 megacycles. These master clock signals are permanently recorded on the surface of the disk 10 and are employed in accordance with the principles of this invention to control both read and write operations at multiple frequencies whereby data may be stored on, or recovered from, disk 10 in all three frequency information zones simultaneously.

WRITE OPERATION

Considering first a write operation, a head select and clock and data read-write control circuit 15 is connected to the clock and address heads 16 through 19. Control circuit 15 in a manner fully described in the referenced patent application, initiates a write operation by presenting a sought-after address to the address comparison circuit 21 and selects the clock and address head 19. Once address comparison is achieved by circuit 21 the action control flip-flop 22 is set. Clock read amplifier 25 is enabled to amplify and transmit the master clock pulse train from clock zone 14 of disk 10. Clock read amplifier 25 applies this continuous train of master clock pulses appearing at a frequency of 2 megacycles to a clock and phase sequence circuit 30, and to an intermediate phase generator 35. Two intermediate phase generators, 35 and 45 are provided. The outputs from phase generators 35 and 45 are applied to the clock and phase sequence circuit 30. Each phase generator produces pulses at the same frequency as the master clock frequency and these auxiliary phases $\phi_1$ and $\phi_2$ are each shifted by ⅓ of the bit period of the highest information frequency of the master clock as shown in the top three rows of pulse forms, FIG. 3.

Phase sequence circuit 30 selectively combines the master clock train with the auxiliary phases $\phi_1$ and $\phi_2$, and emits an output of two additional auxiliary clock pulse trains each having a frequency equal to the data frequency for the mid-range and low frequency zones on disk 10. These auxiliary clock trains are depicted in FIG. 3 as zone 11 and zone 12 clock trains.

Figure 2:
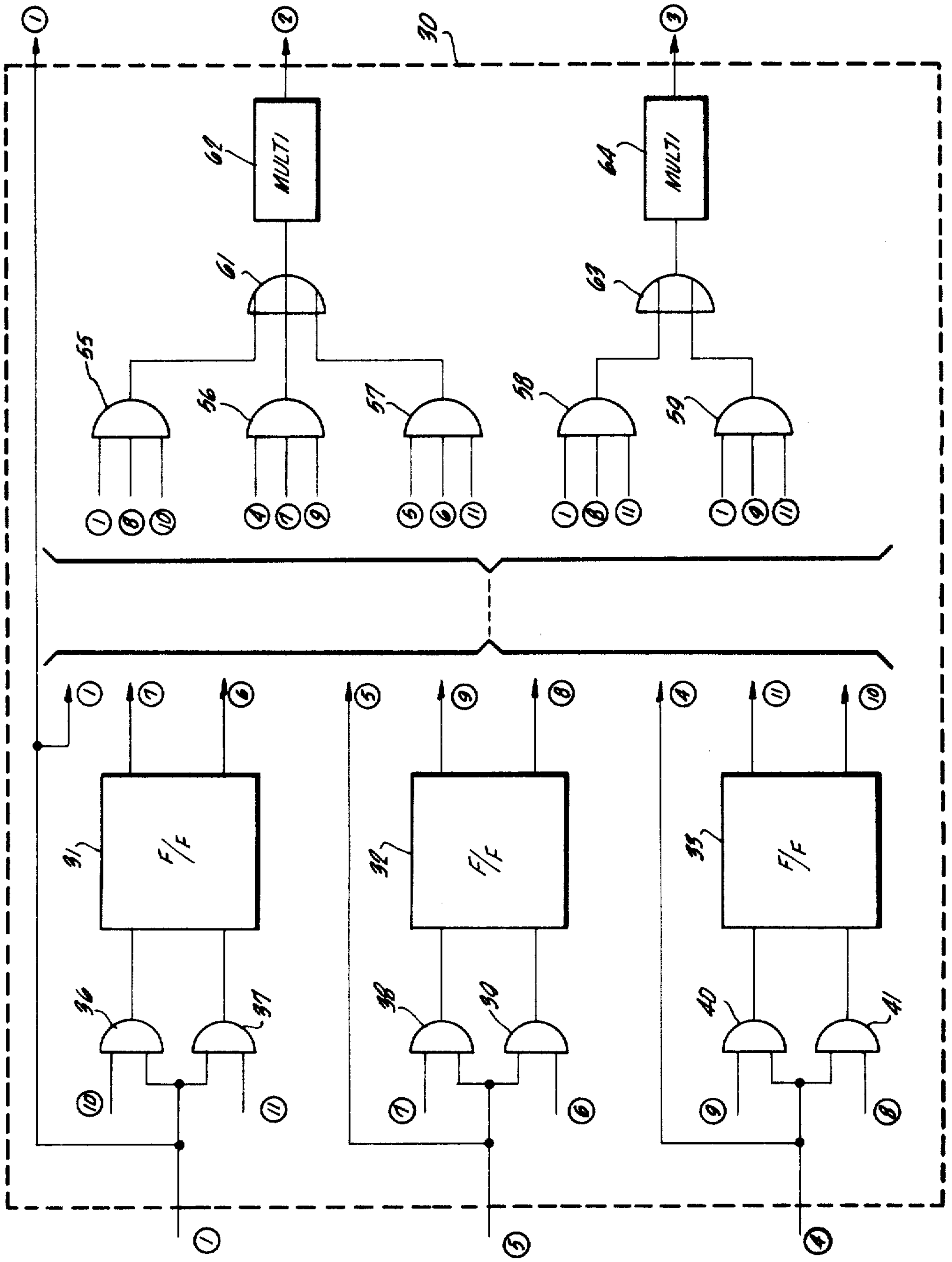
FIG. 2 is a combined block and logic diagram for the master clock pulse train and auxiliary phase pulse train sequencing circuit of FIG. 1.

The operating circuit details for the clock and phase sequence circuit 30 are shown in FIG. 2. The circled numbers associated with FIG. 2 indicate similarly numbered wave forms shown in FIG. 3. An output signal from action control flip-flop 22 is not included in FIG. 3 but such output, it should be understood, resets in a standard manner, flip-flops 31 through 33 of FIG. 2, and thus initiates a write operation. Reference to FIG. 2 and the wave forms of FIG. 3 discloses that the master clock train 51 is applied to a pair of AND input gates 36, 37 associated with flip-flop 31. The auxiliary phases 52 and 53 are applied respectively to two other pairs of AND input gates 38, 39 and 40, 41 respectively associated with flip-flops 32 and 33. Flip-flop circuits 31 through 33 may be any well-known bistable circuit having two opposite polarity output levels of controlled duration in response to input signals applied through either AND input gate. These output levels for each flip-flop 31 through 33 are shown in FIG. 3 and are designated in accordance with the state of the flip-flop device by well-known terminology, as either a "0," such as (FF32' level), or a "1," (FF32 level).

A plurality of output AND gates 55 through 59 are associated with flip-flops 31 through 33. These AND gates are controlled in part by the outputs of flip-flops 31 through 33 and in part by the master clock and auxiliary phase trains 51 through 53, FIG. 3. AND gates 55 through 57 are connected through an OR gate 61 to a monostable multivibrator circuit 62. Multivibrator 62, in a well-known fashion, emits an output pulse of precisely controlled shape and duration for each pulse gated through OR gate 61. Repetitive output signals from multivibrator 62 constitute write clock pulses 71 for data zone 12, FIG. 3. This zone 12 clock is generated in the manner described hereinafter.

Gating conditions for AND gate 55 are true, or satisfied, for a pulse appearing in the first bit period defined by master clock train 51 (bit period 1) and for every fourth pulse thereafter from the master clock pulse train 51. Gating conditions for AND gate 56 are true upon appearance of a pulse in phase 52 occurring in the next bit period defined by master clock train 51 (bit period 2) and for every fourth pulse of auxiliary train 52 thereafter. AND gate 57 is true upon appearance of a pulse of phase 53 occurring in the third bit period defined by master clock train 51 (bit period 3) and every fourth pulse thereafter from phase 53. Each time that AND gates 55 through 57 are true, OR gate 61 triggers multivibrator 62. Accordingly, in the order just defined, pulses from the master clock train 51 and the two auxiliary phase trains 52 and 53 are repetitively sequenced, and multivibrator 62 is caused to emit a series of output pulses which together form the zone 12 clock train 71. This clock train 71 has the proper frequency for writing data in zone 12.

In zone 11, as previously discussed, the data frequency is equal to one-half of the frequency of the master clock train. A pair of AND gates 58 and 59, under control of flip-flops 32 and 33 selectively sequence the master clock pulse train 51 so that every other pulse in the master clock train 51 is gated through OR gate 63. Multivibrator 64 thus emits an output pulse train of proper frequency for writing data in information zone 11.

The three clock trains 51, 71, and 81, FIG. 3, present at the output of phase sequence circuit 30, FIG. 2 are respectively equal in frequency to the required frequency for data transfer in the three information zones 11, 12 and 13 of disk 10. In a write operation, these three clock trains 51, 71, and 81 are used to concurrently control shifting of data from three separate shift registers 72, 73, and 74, FIG. 1, to the disk file 10. A remote unit 50 which may, for example, be any outside peripheral unit, supplies binary information to be written on disk 10 in parallel form to shift registers 72 through 74. Data from each of the shift registers is shifted out serially to data write heads 16 through 18 and written on disk 10 in accordance with the frequency of the zone into which such data is to be written. One example of suitable logic and shift register details for this operation may be in accordance with the description of a patent application filed on even date herewith and assigned to the same assignee as the present application entitled "Shift and Buffer Circuitry" and given Ser. No. 579,118, and naming as inventors Norman S. Blessum and Charles A. Vietor.

READ OPERATION

The master clock train 51 and auxiliary phases 52 and 53 are also employed as timing sources for generating read strobe pulses, one each for each data frequency. A read operation requires an output from the read and write control 15 to turn on the address head 19 and the address comparison circuit 21. As previously described, each sector of all information zones of disk 10 is assigned an address in the master address track 14. A sought-out address is read by the address comparison circuit 21 and compared with the addresses from the address track 14 until address coincidence is obtained. When address coincidence is obtained, the action control flip-flop 22 is set thus signaling the fact that the next information to be read is the first information signal of the record sought at that address. This operation is fully described in the foregoing referenced patent application having Ser. No. 306,365 and need not be repeated here.

Prior to a detailed discussion of the multiple frequency read operation of this invention, a brief review of the prior art approaches and troublesome problems unsolved prior to the advent of this invention is in order. It has been discovered that when information is written concurrently in the three information zones 11 through 13 on the magnetic disk 10 and later such information is to be read, the information bits may have shifted relative to their original position as referenced to the master clock pulse train of zone 14. Vibration, temperature changes, and slight rotational movement of the disk on its driving shaft are some of the primary factors causing such data location shifts. In the example of this invention the "pie" shape of disk 10 includes, for a given disk rotation, nine information bits to be recovered. Any slight movement of the disk about its axis of rotation between the time of writing and a subsequent reading operation represents a deviation from the original position of such information. As an extreme example, vibration and other such adverse conditions have caused as much as two bit periods shift in information locations relative to its original written location referenced to the master clock signal.

Accordingly, we have discovered that the information itself, when read, may be utilized to advantage in synchronizing clock signals for all frequencies rather than having the clock signal attempt to define the data locations. In order to accomplish this synchronization, the bit period for each distinct data frequency is divided into a repetitive cycle of a plurality of sub-period intervals, or portions. A clock pulse is present during each one of the sub-period intervals and is utilized in conjunction with a synchronizing mark which is always written in the data zones immediately prior to the first data signal, in order to accomplish synchronized data reading. This synchronizing mark is present immediately preceding the first bit of information for each record in each one of the data zones, and thus disk vibration or rotational shifts cannot disturb the position of this mark relative to its associated information. Coincidence of this synchronizing mark and any one of the plurality of pulses present during sub-period intervals is utilized to select the next following pulse appearing in a sub-period interval as the initial reading strobe pulse for a data read operation in that zone. In order to avoid any false coincidence which may result from the simultaneous presence of a synchronizing mark and a noise transient totally out of phase with the true information locations, logic is employed which isolates the continuously generated cycles of each one of the desired frequencies from the read circuitry until a true data location in synchronization with one proper sub-period interval is selected.

The multiple frequency strobe select operation of this invention is depicted in block form in FIG. 1. A read strobe select circuit 80 has for its inputs the master clock pulse train 51 and the two secondary clock trains 52 and 53, FIG. 2. Circuit 80, in a manner to be described in detail with respect to FIGS. 3 and 4, sequences these inputs into the appropriate multiple data frequencies required and further generates a plurality of sub-period pulses within each bit period for all of the multiple data frequencies. Circuit 80 additionally selects the sub-period pulse within each bit period of each distinct frequency of the multiple data frequencies that is synchronized with the data location for that frequency, and applies this selected pulse as a reading strobe pulse to data registers 82, 83 and 84. These registers receive data in serial form from the read heads 16 through 18 and are available to store such data when a shift command is received from strobe select circuit 80.

The operations of shifting, storing and reading out from shift registers 82 through 84 are described in detail in the referenced patent application filed on even date herewith and need not be repeated here. Suffice it to say that shift registers 82 through 84 may be separate as shown, or may be the same registers 72 through 74 adapted logically to store information serially and to read out such information in parallel form. Register 82 is shown capable of receiving and storing four binary information bits shifted in serially at the highest data frequency of zone 13 under shift commands from the zone 13 strobe output 80A of circuit 80. Register 83 in a similar manner is shown capable of storing three binary bits of information shifted in serially under command of zone 12 strobe output pulses on 80B. Register 84 is adapted to store two binary bits of information under control of zone 11 strobe output on 80C. These nine bits of information are read and stored in concurrent operations in registers 82 through 84 under control of three different shifting frequencies in keeping with the three different data frequencies appearing under read/write heads 16 through 18 as disk 10 rotates through a predetermined angular arc.

The operation of strobe select circuit 80 in synchronizing the binary bit locations in the multiple frequency data zones 11 through 13 of disk 10 with appropriate strobe pulses is described in detail hereinafter. For ease of understanding each data frequency will be considered separately, although it should be understood that read operations for all data frequencies take place concurrently and all are under control of the master clock train 51 and the two military phases 52 and 53.

Data of zone 13 is synchronized with either the master clock pulse train 51, or one of the auxiliary phases 52 or 53 of FIG. 3. As shown in FIG. 3, three pulse trains 51 through 53 divide the bit period No. 1 of zone 13 into three sub-period intervals. Bit period No. 1 of zone 13 and the manner into which it is divided as sub-period portions by clock 51 and the two auxiliary phases 52 and 53 is shown in FIG. 4A.

Figure 4:
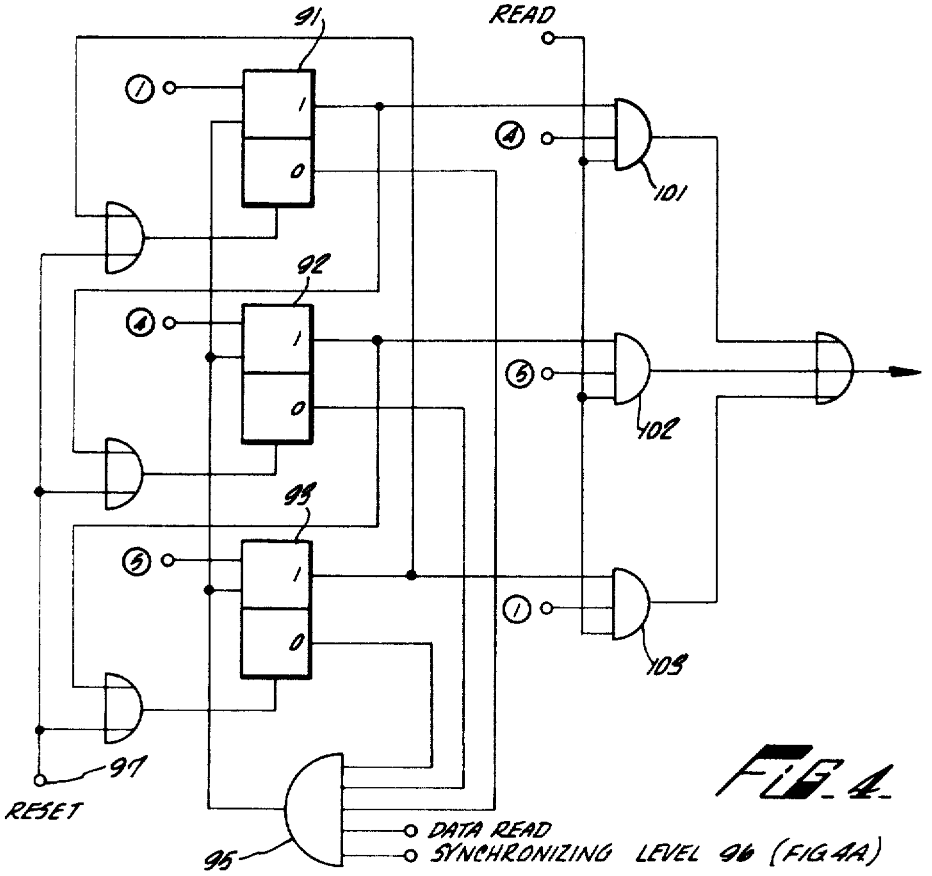
FIG. 4 is a combined block and logic diagram of a data reading strobe selection circuit of FIG. 1.

Reference to FIG. 4 depicts that trains 51, 52 and 53 are applied at two different locations in the zone 13 strobe select shown in combined block and logic form. Pulse trains 51 through 53 are applied in respective order of appearance to three bistable circuits 91 through 93, all of which are initially set in a "zero" state with a negative output level being considered as "true." Each bistable circuit has an output terminal which is, in turn, connected to one-gate of a plurality of output isolating AND gates 101 through 103. Each subsequent appearing pulse train of trains 51 through 53 that is subsequent in order of appearance to that applied to an associated bistable device is applied as an input to that bistable device's AND gate. These bistable devices 91 through 93 do not change their original state in response to pulse trains 51 through 53 unless and until a data synchronizing mark is gated through the synchronizing AND gate 95 and is applied to the bistable circuits to ready them for a change of state. An output from each bistable circuit 91 through 93 is applied as an initially true input to synchronizing AND gate 95. In a data read operation, as hereinbefore described in connection with FIG. 1, the read condition is also true for AND gate 95, and thus only the synchronizing mark need appear for AND gate 95 to be satisfied.

Figure 4A:
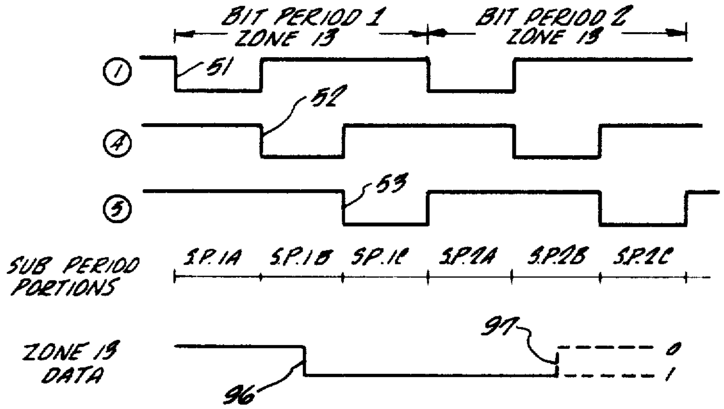

The synchronizing mark 96 referred to hereinbefore is a level as shown in FIG. 4A. This synchronizing level 96 is always written on the storage medium immediately prior to the first bit of information to be recovered from any addressed portion of zone 13. Synchronizing level 96 is shown, for example, in synchronization with pulse train 52. With the appearance of level 96, AND gate 95, FIG. 4, is satisfied and all of the bistable circuits 91 through 93 are in a ready condition for one of them to change state. In the example given pulse train 52 is in synchronization with the data location and thus bistable circuit 92 changes state i.e. assumes a "one" state in response to the input pulse 52.

This change of state in circuit 92 presents a false condition to AND gate 95, thus blocking any further selection. The change of state in circuit 92 is also coupled by feedback to the reset lead of the remaining two bistable circuits 91 and 93. Inasmuch as they are already reset, they do not change state and this feedback path to the two remaining circuits 91 and 93 assures that one pulse train only is selected.

Bistable circuit 92 upon change of state presents a true condition to AND gate 102. The read lead, of course, is true for AND gate 102. Another concurrent input to AND gate 102 is the next appearing pulse 53. Accordingly, pulse train 53 is selected by gate 102. The pulse of train 53 immediately following in the same bit period with synchronizing level 96, is gated through to shift register 82. This first pulse is not actually employed as a data shift pulse in register 82 but rather serves as a conditioning bit to put shift register 82 in proper condition for receiving data from the read head 16. The manner in which this conditioning operation serves to place shift register 82, and shift registers 83 and 84 as well, is described in the concurrently filed application referred to hereinbefore and need not be reported here. Each pulse of train 53 appearing in the bit period which follows is applied as a read strobe pulse to store data read from zone 13 into shift register 82. This data, which follows in the next bit period No. 2, may be either a "zero" or a "one" as shown in dashed lines in FIG. 4A. The first data bit 97, FIG. 4A is the first data bit stored in shift register 82, FIG. 1, from zone 13. After a complete record has been read from zone 13 of disk 10, a reset pulse applied at terminal 97, FIG. 4, resets all bistable circuits 91 through 93. When an additional or subsequent record is to be read from data zone 13, the operation just described is repeated and the sub-period interval which is closest in time relationship to the data location in zone 13 is selected. In the example just given the final sub-period interval (S. P. 1C, S. P. 2C . . . S.P.N.C.) was the sub-period interval in synchronism with the data location. In another read operation, of course, another one of the sub-period intervals may suitably match the data location, depending upon the amount of shaft rotation and other factors which cause displacement in data locations relative to the original recorded locations.

Figure 5:
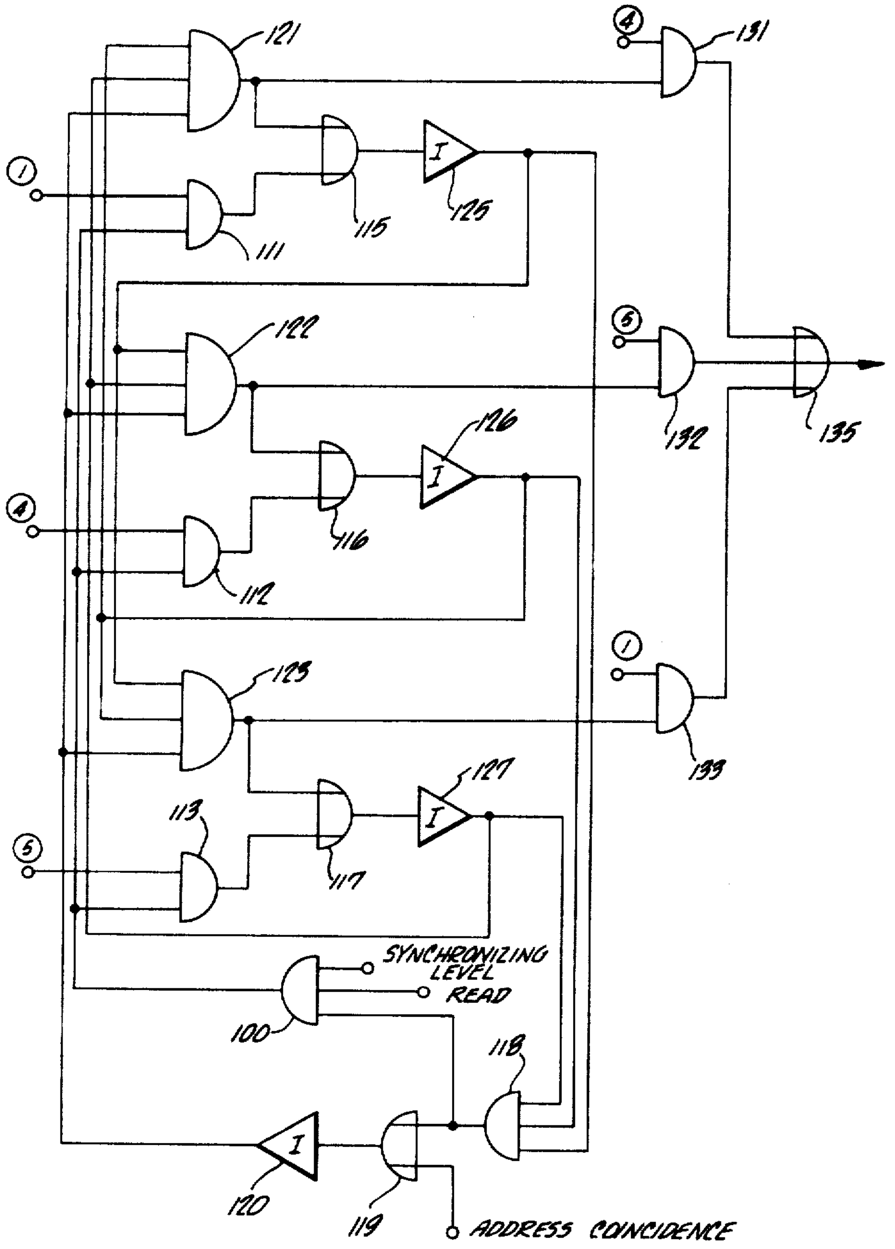
FIG. 5 is an alternative block and logic diagram of a data reading strobe selection circuit.

An alternative circuit for achieving accurate read strobe selection is shown in FIG. 5. In the strobe selection circuit of FIG. 5, it is again assumed that the three pulse trains, including the master clock train 51 and auxiliary phases 52 and 53, are applied as inputs to the strobe select circuit. In this instance the pulse trains 51 through 53, FIG. 4A, are applied to three strobe select gates 111, 112 and 113. Associated with each strobe selection gate is a latch-up gate designated as 121, 122 and 123. Each strobe selection gate and its associated latch-up gate are together connected to the input of an inverter through OR gates 115, 116, and 117. Three inverter circuits 125, 126 and 127 are provided with the output of each inverter applied to the latch-up gates associated with the next following pulse trains. The outputs of all inverters 125, 126 and 127 are ANDED together in AND gate 118. AND gate 118 has its ouput connected through OR gate 119 to a latch-up inverter 120. The output of each latch-up gate 121, 122, and 123 is applied to output isolating gates 131, 132 and 133 respectively.

The operation of the circuit of FIG. 5 may be further understood by considering that the action control flip-flop 22, FIG. 1, has responded to an output from address coincidence comparator 21 and has emitted an action control command signal. This command signal is applied through OR gate 119 to inverter 120, the output of which is driven false. This false output from inverter 120 is applied to all of the latch-up gates 121 through 123. Inasmuch as the synchronizing pulse is always subsequent to address coincidence, all of the latch-up gates 121 through 123, have at least one input false during the period between address coincidence and the synchronizing pulse. Prior to receipt of a synchronizing pulse, gate 100 has its output false, and accordingly, none of the AND gates 111 through 113 have all input conditions true. Inverters 125 through 127, thus have true output signals which are presented to AND gate 118 so as to hold that gate and AND gate 100 in a ready condition for the appearance of synchronizing pulse 96, FIG. 4A.

Upon receipt of the synchronizing pulse 96 at the input of gate 100, all its AND conditions are true and the output of gate 100 is thus applied in common to each of the phase selection gates 111 through 113 respectively. The other input to these gates 111 through 113 is the pulse trains 51 through 53 respectively of FIG. 4A. Assuming again for purposes of example that synchronizing pulse 96, FIG. 4A, appears as shown, then clock pulse train 52 and the synchronizing pulse 96 satisfy the input conditions for AND gate 112, and a true input signal drives inverter 126's output false. This false output from inverter 126 in turn causes a false output at gate 118 and hence inverter 120's output is now true. This true output from inverter 120 is applied to all of the latch-up gates 121 through 123. Latch-up gate 122 is the only AND gate satisfied because latch-up gates 121 and 123 have a false input signal applied by inverter 126. Accordingly, latch-up gate 122 is satisfied, its output is true, and inverter 126's output is held in its false condition and the circuit of FIG. 5 is latched-up until cleared. A true output is applied by AND gate 122 to isolating gate 132 and thereafter input train 53 is gated through OR gate 135 as the selected strobe pulse for reading information in the highest frequency zone 13.

In the foregoing described operations of FIGS. 4 and 5, the master clock pulse train 51 and the auxiliary phases 52 and 53 are of proper frequency for the highest information frequency zone 13.

Of course, the bit periods of zone 13 may be subdivided into a different number of sub-period intervals if more or less accuracy of data synchronizing is desired. In the particular application of this invention it was found that three sub-period intervals provide sufficient flexibility and accuracy for data synchronization, however the principles of this invention are not to be limited by the embodiments of FIGS. 4, 4A, and 5.

The strobe select operation for the remaining two data zones 11 and 12 will now be described. It should be understood that with respect to the lowest frequency information zone 11 that the master clock pulse train 51 and the auxiliary phases 52 and 53 are again applied to the read strobe select circuit 80 of FIG. 1. One train, which is accurately synchronized with a data location, is selected for a read strobe pulse in information zone 11, and, in addition, the selected train is also converted to the proper frequency for data zone 11. This pulse train selection and frequency conversion operation for achieving the strobe read pulse for zone 11 is described hereinafter with respect to FIG. 6.

Figures 6, 6A:
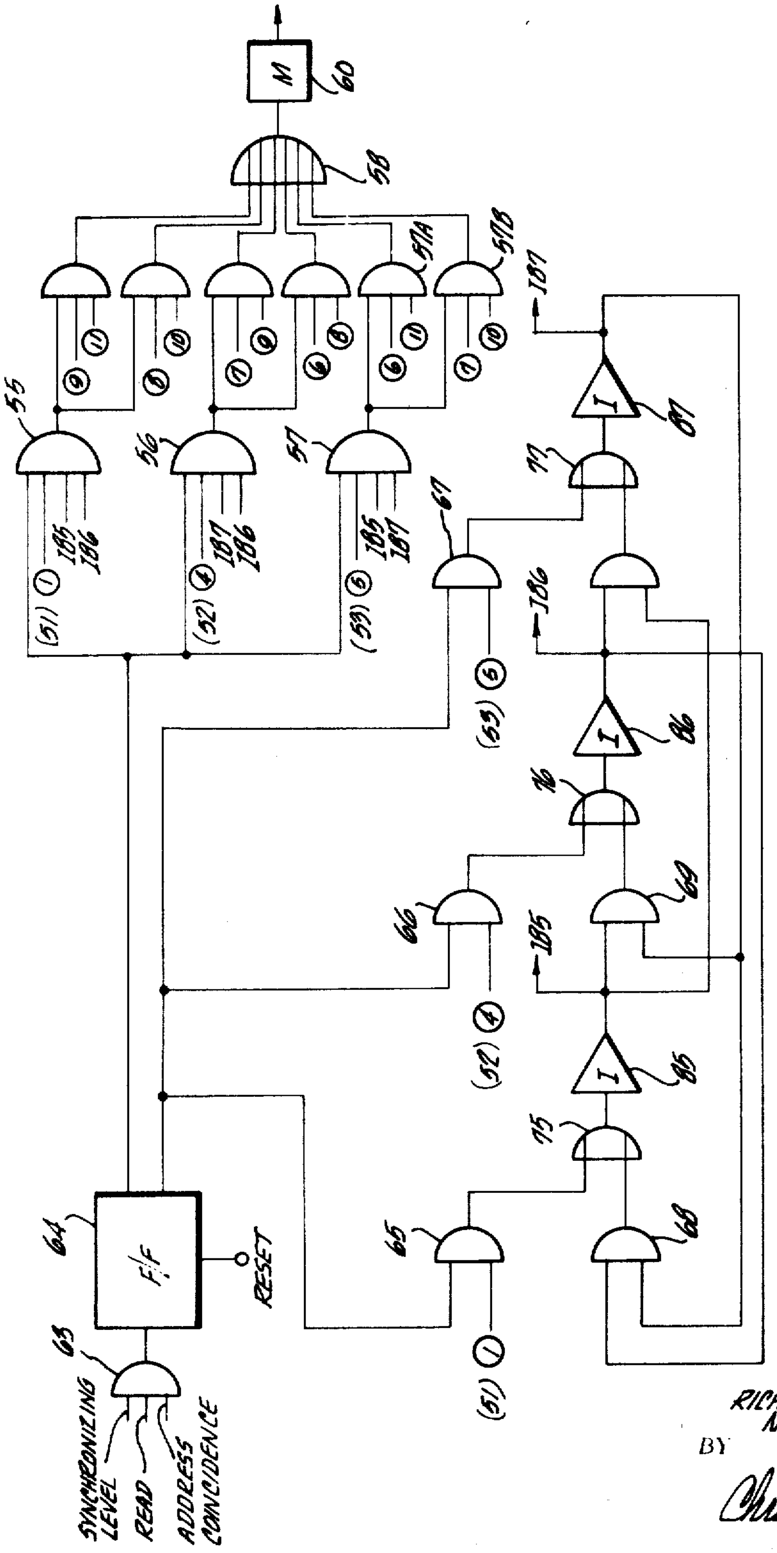

In FIG. 6, the synchronizing pulse which is always recorded immediately prior to the first information in a record to be read, is applied as one input to AND gate 63. The other two inputs for AND gate 63 are provided during a read operation and address coincidence as previously described. Prior to receipt of the synchronizing pulse, bistable circuit 64 is normally set in an initial state with a false output applied to AND gates 55 through 57. This initial state for circuit 64, also applies a true input to the three AND gates 65, 66 and 67. These AND gates 65 through 67 also receive as second inputs, the pulse trains 51, 52 and 53. Each AND gate has its output connected through an OR gate to an associated inverter. For example, AND gate 65 is connected through OR circuit 75 to an inverter 85, AND gate 66 is connected through an OR gate 76 to an inverter 86, and AND gate 67 is connected through an OR gate 77 to an inverter 87.

The table of FIG. 6A is useful in understanding the circuit operation of FIG. 6. In the table of FIG. 6A the various states of the inverter circuits 85 through 87 are listed in accordance with their condition during the appearance of pulse trains 51 through 53, FIG. 4A. The first horizontal row in the table of FIG. 6A discloses the condition for inverters 85 through 87 immediately subsequent to the appearance of pulse train 51 at AND gate 65. At this instant the input conditions for gate 65 are true and a true signal is presented to inverter 85, driving its output false. At this same instant, the input conditions for AND gates 66 and 67 are false and thus the outputs for inverters 86 and 87 are true. The true output signals from inverters 86 and 87 are fed back through an AND gate 68 which gate is satisfied by the true input conditions from inverters 86 and 87 and holds inverter 85 in a false output condition even after pulse train 51 goes false.

Upon receipt of the next pulse presented by pulse train 52, inverter 86 assumes a false output condition which false output is also fed back to AND gate 68 which in turn drives inverter 85 to a true output condition. Inverter 87 holds its true condition as shown in the table of FIG. 6A and AND gate 69 is satisfied and presents a true condition to the input of inverter 86 so as to hold inverter 86 false after pulse train 52 goes false.

Upon receipt of the next pulse of train 53, inverter 87 is driven false and its output is fed back to AND gates 68 and 69 thus assuring that inverters 85 and 86 are held in a true condition. From the foregoing description and the table of FIG. 6A, it is apparent that the circuit of FIG. 6 operates as a three-phase clocked ring counter in that a false condition in synchronism with the clocking pulses steps through the different stages as represented by inverters 85 through 87, respectively. It should be readily apparent that additional stages may be added at either end of the circuit of FIG. 6 to provide a higher stage clocked ring counter.

Assuming that a synchronizing pulse is received by AND gate 63, FIG. 6, the state of circuit 64 is changed. This change in state of circuit 64 presents a false level to all of the AND gates 65 through 67. Accordingly, the inverters 85 through 87 are locked in the condition which existed at the time synchronization occurred. Assuming the synchronizing pulse 96 is again coincident with the input pulse train 52, FIG. 4A, the bistable circuit 64 changes state and locks the circuit with outputs from inverters 185 and 187 true and the output for inverter 186 false as is shown in the second horizontal row of table 6A.

The output leads from each of the inverters 85 through 87 are connected to a plurality of AND gates 55 through 57. These AND gates 55 through 57 receive the input pulse trains 51 through 53 respectively and also each AND gate receives a true condition from bistable circuit 64 once the synchronism pulse has been received. With the inverters locked in the logic conditions just described , the inverter terms 85 and 87 are the only two terms which are true. Accordingly, the pulse train 53 applied to AND gate 57 is the pulse train which is selected and is transmitted to a pair of AND gates 57A and 57B connected to its output lead. AND gates 57A and 57B receive additional input terms from the bistable circuits 31 and 33 of FIG. 2. The states of the bistable circuits 31 and 33 are depicted by the output levels shown in FIG. 3. As the bistable circuits 31 and 33 of FIG. 3 are alternately changed, AND gates 57A and 57B are satisfied. This alternate operation selects every other pulse from the select input train 53. As described hereinbefore, the proper frequency for zone 11 is one-half that of zone 13. The outputs of AND gates 57A and 57B are applied through OR gate 58 to a multivibrator circuit 60 which forms the read strobe pulse train for zone 11. Thus, read strobe pulses which are in synchronism with a data location and is of the proper frequency for the lowest frequency data zone has been provided by the new and novel circuitry of this invention. This zone 11 read strobe pulse is applied to shift register 84, FIG. 1, to store, concurrently with the storage operations for shift registers 82 and 83, information read by head 18 from the innermost data zone 11. The phase-locked ring counter operation of FIG. 6 is also utilized in the read strobe select operation for the mid-range frequency required for reading information from zone 12. For mid-range frequency zone 12 it is necessary to add another inverter 188 to the circuit of FIG. 6. This additional inverter 188 is connected serially to 187 as an additional stage and is shown representatively in the table of FIG. 7A. Zone 12 requires four sub-period intervals. These four sub-period intervals are defined by the pulse trains 51, 52, 53 and 51 repeated again during a bit period for information zone 12, as is shown in FIG. 7B. Each pulse within a bit period for zone 12, in the manner described earlier in connection with FIG. 6, steps a false condition through the inverter circuits 185 through 188. The table of FIG. 7A summarizes the inverter states.

Assuming, as shown in FIG. 7B that the synchronizing pulse 96 appears coincidentally with a pulse from input train 53, then the inverter circuits 185 through 188 are locked in the condition shown in the third horizontal row of the table of FIG. 7A.

Figure 7:
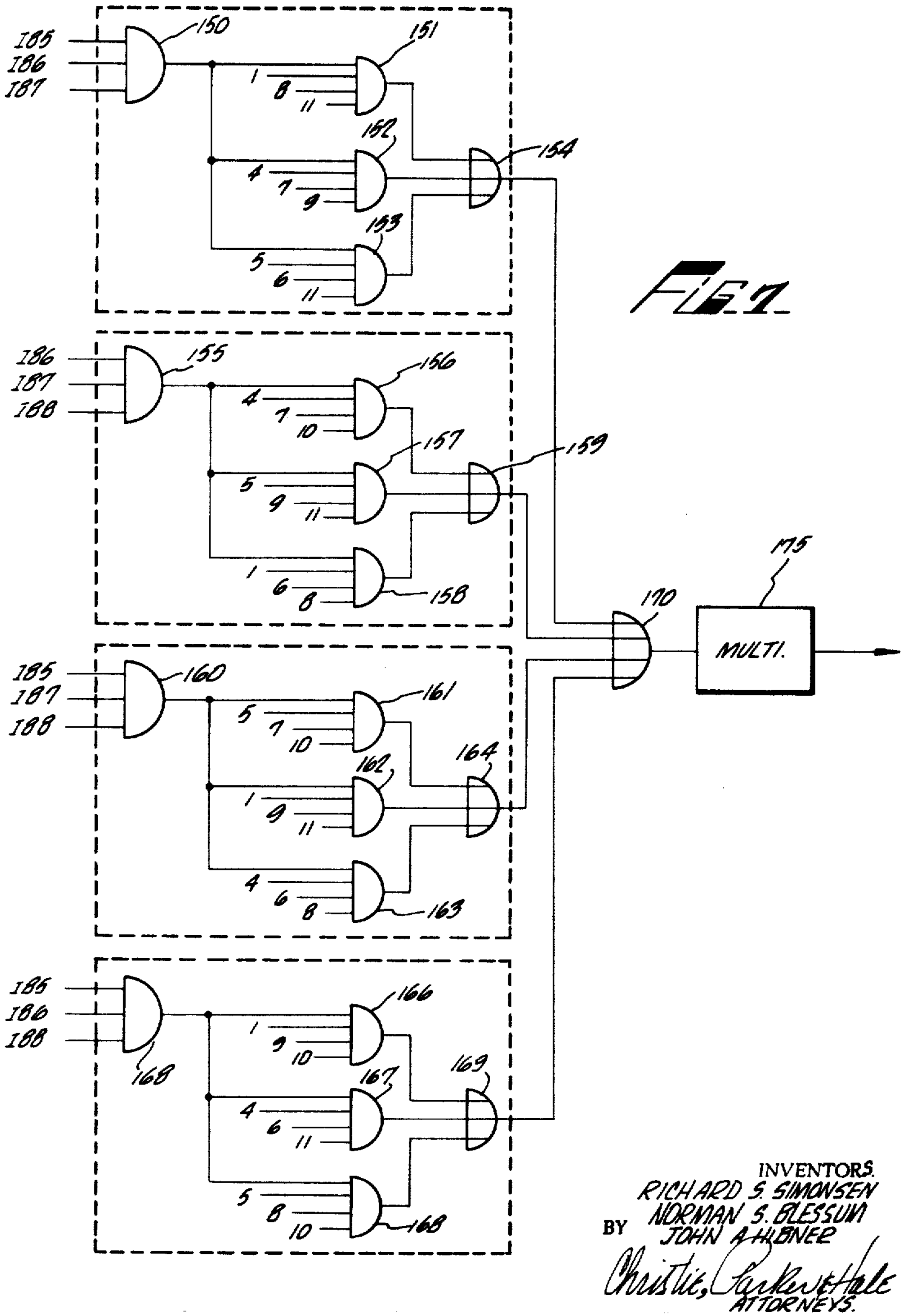

FIG. 7 discloses the read strobe selection circuitry for establishing a read strobe pulse train for zone 12 which is in synchronism with the data location and is of the proper frequency for data zone 12. Inverter outputs 185 through 188 are connected to a plurality of AND gates 150, 155, 160 and 165. One only of these AND gates is satisfied depending upon which gate has all of its input terms true when the synchronizing level 96 appears and locks-up the states of inverters 185 through 188.

Each one of the AND gates 150, 155, 160 and 165 is associated by the true condition applied at the inputs by pulse trains 51 through 53, with one of the four sub-period intervals for each period of zone 12, as is shown more clearly by FIG. 7B. One only of AND gates 150, 155, 160, or 165 is selected by coincidence of a pulse from one of the trains 51 through 53 and the synchronizing level 96. Selection of one AND gate provides a true condition to the output AND gates controlled by the selected gate. These output AND gates are repetitively enabled, and thus repetitively trigger multivibrator 175. The first pulse emitted by multivibrator 175 after coincidence between one pulse train and synchronizing level 96 is a conditioning pulse which is applied to condition shift register 83 for receipt of data from zone 12 of disk 10, FIG. 1. Thereafter the pulses emitted by multivibrator 175 control shifting of data in shift register 83.

For example, assume that synchronizing pulse 96, FIG. 7B, appears as shown in FIG. 7B in synchronism with a pulse from train 53. FIG. 7A shows, in the third horizontal row of the table, the inverter states as they would be held and locked in position by pulse 96, in a manner similar to that described hereinbefore with respect to FIG. 6 and Table 6A. Thus, inverters 185, 186 and 188 are true and inverter 187 is false. AND gate 165 is thus the selected AND gate, and it, in return, presents a true condition to its output AND gates 166 through 168. Output levels associated with bistable circuits 31 through 33, FIG. 2, also provide input terms to output AND gates 166 through 168. These levels are shown in FIG. 3 and serve to alternatively gate out in a repetitive fashion one pulse from each one of the trains 51 through 53. These pulses which are gated out are applied through OR gates 169 and 170 to trigger multivibrator circuit 175, which emits a conditioning pulse and read strobe pulses for shift register 83.

Different pulses of the master clock train 51 and the auxiliary phases 52 and 53 are utilized in the manner just described to provide a proper frequency read strobe signal for zone 12. Accordingly, the unique circuitry of this invention allows a single clock track of one frequency on a storage medium to be utilized so as to form a plurality of frequencies which correspond to a plurality of different data frequencies present on the storage medium. In addition, this single clock track is repeated and varied in phase so as to define plural sub-period intervals within each period of each frequency so that data locations may be synchronized with the one sub-period interval which is most accurately aligned in time with the data locations on the storage medium.

It is to be understood that the foregoing features and principles of this invention are merely descriptive, and that many departures and variations thereof are possible by those skilled in the art, without departing from the spirit and scope of this invention.

What is claimed is:

1. A system for timing the flow of data relative to a storage media comprising:

a digital data storage media having stored thereon binary data in the form of bits having a predetermined bit frequency, said storage media having at least two distinct bit frequencies stored in at least two distinct data storage sections of the media, a clock track having repetitive binary bits corresponding in bit frequency to the frequency of bits stored in one of the data storage sections on said media, means for recovering said clock track of one bit frequency from said media and for providing a first train of clock pulses having a pulse repetition rate equal to the bit frequency of said one data storage section, means utilizing said first train of clock pulses for transferring binary bits of said one bit frequency relative to its distinct associated storage section on said storage media, means for converting said first train of clock pulses into a second train of clock pulses having a pulse repetition rate equal to the bit frequency of said other storage section on said storage media, and means utilizing said second train of clock pulses for transferring binary bits of said other bit frequency relative to its distinct associated storage section on said storage media.

2. A system in accordance with claim 1 and further comprising at least two storage registers, each register being associated with one of the data storage sections of the media:

control means including means supplying binary data to said registers, which data is to be stored on said media in said data storage sections, a data channel between each register and its associated data storage section for transferring binary data from said registers to said storage media, and means applying said first train of clock pulses to said first register and said second train of clock pulses to said second register for storing binary strings of data in said two storage sections of the media simultaneously and at said two distinct bit frequencies.

3. A system in accordance with claim 2 wherein said storage media is a magnetic disk file having at least two concentric data zones on the same side of the disk comprising said distinct storage sections, and wherein said clock track comprises a plurality of bits recorded on said disk at the same bit period and frequency as that of one of the data zones, and further comprising at least:

one data segment to be recovered in the form of a plurality of binary bits comprising the data segment and stored in one bit group in one data zone and another bit group in said at least second data zone, read and write heads for said disk operative for simultaneously recovering said bit groups during relative movement of the disk under the heads, and means connecting said heads to said storage registers for supplying simultaneously thereto strings of bits recovered from said data zones.

4. A system in accordance with claim 3 wherein:

said bits forming said bit groups are asynchronous relative to said bits of said master clock track, and further comprising:

a synchronizing bit recorded on said disk immediately preceding each bit group, means for establishing a plurality of phases of pulses for both said first and second trains of clock pulses, means recovering said synchronizing bit from both of said data zones, and including means selecting phases of pulses from the plurality of phases for both of said first and second trains of clock pulses which are in synchronism with the bits of the respective bit groups, and means applying said selected phases of pulses to said storage registers for storing said bit groups therein.

5. A digital data processing system comprising:

a storage media wherein a data segment is in the form of a plurality of binary bits stored in a plurality of distinct portions of said media, each of said binary bits associated with a data segment having a predetermined period and frequency in a distinct portion of the media which is different from the predetermined period and frequency of other bits which comprise part of the same data segment and are stored in at least one other distinct portion of the storage media, a master clock timing track on said media associated with a bit period and frequency of one only of the storage portions of the media for controlling clocking of binary bits relative to said one only portion of said media, means for deriving a train of master clocking pulses of the same period and frequency as said master clock timing track, means for converting said train of master clocking pulses into a plurality of timing pulse trains each having the same period and frequency as one of the bit periods and frequencies of one other of said portions of the storage media, and means utilizing said plurality of other timing pulse trains for simultaneously transferring binary bits forming a complete data segment relative to all portions of said media.

6. A system in accordance with claim 5 wherein:
said storage media is a magnetic disk having at least three concentric data storage zones on one side thereof,
said data segment comprises bits stored in each of the three data storage zones, and further comprising
recovery means individual to each zone and each responsive to a timing pulse train for recovering simultaneously and at different frequencies the bits of all three zones comprising said data segment.

7. A digital data processing system comprising:
a magnetic disk having information bits stored in a plurality of zones thereof, each zone having a bit frequency distinct from the other zones, the information bits comprising a plurality of information characters, each character consisting of bits from each of the zones and wherein the bits of a single character and within a single zone comprise a byte,
a plurality of shift registers, each of the registers being associated with one of the zones,
a clock track on said magnetic disk having a first frequency suitable for serial transfer of bits from one only of said zones,
clock track recovery means,
means including said clock track recovery means for serially transmitting a byte of bits from said one only zone to its respective register,
means responsive to said clock track recovery means for emitting a plurality of clocking signals each having a frequency distinct from the first frequency and suitable for serially transmitting bytes of bits from each of the remaining zones to its respective shift register, and
means applying the emitted clocking signals to the shift registers associated with zones other than said one zone for serially transmitting bytes of bits from the remaining zones to their respective shift registers simultaneously with the transfer of a byte of bits from said one zone to its respective shift register.

8. A system in accordance with claim 7 wherein:
said magnetic disk comprises first, second, and third zones, and
the bit frequency of said second zone is of a lower frequency than the first zone and of a higher frequency than said third zone.

9. A digital data processing system in accordance with claim 8 wherein:
the bit frequencies of the three zones are in a ratio of 4 to 3 to 2, and the ratio of bits per byte for the three zones is also 4 to 3 to 2.

10. A digital data processing system comprising:
a magnetic disk having information bits stored in first, second and third zones thereof, each zone having a bit period and frequency distinct from the other zones, information bits comprising a plurality of information characters, each character consisting of bits from each of the zones wherein the bits of a single character and within a single zone comprise a byte, a first synchronizing mark associated with and immediately preceding each byte in said first zone, a second synchronizing mark associated with and immediately preceding each byte in said second zone, a third synchronizing mark, associated with and immediately preceding each byte in said third zone,
a single clock track on said magnetic disk having a bit period and frequency the same as the bit period and frequency of one only of said zones,
timing means including means recovering said clock track and responsive thereto for emitting;
a first recurring cycle of repetitive pulses appearing in sub-period intervals within a first period equal to said bit period of said first zone, each same ordered sub-period interval repetitively appearing in each cycle defining a clocking pulse train of said bit frequency of said first zone,
a second recurring cycle of repetitive pulses appearing in sub-period intervals within a second period equal to the bit period of said second zone, each same ordered sub-period interval repetitively appearing in each cycle defining a clocking pulse train of said bit frequency of said second zone,
a third recurring cycle of repetitive pulses appearing in sub-period intervals within a third period equal to the bit period of said third zone, each same ordered sub-period interval repetitively appearing in each cycle defining a clocking pulse train of said bit frequency of said third zone,
first, second, and third register means each associated with said first, second, and third zones, and each register responsive to clocking pulses applied thereto for recovering bits from its associated storage zone,
means including means recovering said first, second and third synchronizing marks for selecting the one repetitively appearing sub-period interval in each of said first, second, and third recurring cycles which is in synchronism with the bits of said first, second and third bytes, respectively, and
pulse train applying means connected between said timing means and said first, second, and third registers for applying:
the clocking pulse train defined by the selected sub-period interval of said first cycle to said first register,
the clocking pulse train defined by the selected sub-period interval of said second cycle to said second register, and
the clocking pulse train defined by the selected sub-period interval of said third cycle to said third register.

11. A digital data processing system comprising:
a storage media wherein a data segment is in the form of a plurality of groups of binary bits stored in a plurality of distinct zones of said media, a first bit group of the data segment having a first predetermined bit period and frequency in a first distinct zone of the media, and at least a second bit group comprising another part of said data segment having a second predetermined bit period and frequency different from said first and stored in a second distinct zone of the media,
a master clock timing track on said media in the form of a plurality of binary bits having said first predetermined bit period and frequency,
means for deriving from said master clock timing track a first train of clock pulses of said first predetermined bit period and frequency with one each of the clocking pulses comprising said first clocking train appearing once in each bit period and having a pulse duration less than said first predetermined bit period,
means utilizing said first train of clock pulses for transferring the first bit group comprising part of the data segment to or from said first storage zone,
means including a first clock pulse train receiving means for emitting a plurality of auxiliary pulse trains having a pulse occurrence frequency equal to the frequency of the first clock pulse train and each auxiliary train being shifted relative to the first clock train and relative to each other, and for forming by the pulse durations of individual pulses from the first clock pulse and auxiliary pulse trains a recurring plurality of sub-period intervals, a given number of said sub-period intervals defining said second predetermined period of said second distinct storage zone,
first logic gating means repetitively selecting, at one of said recurring sub-period intervals, individual pulses of said first clock pulse train and said auxiliary pulse trains for deriving a second clock pulse train of said second predetermined period and frequency, means utilizing said second clock pulse train for transferring the second binary bit group comprising part of the data segment to or from said second zone simultaneously with the transfer of the first binary bit group respectively to or from said first zone.

12. A digital data processing system comprising:

a magnetic disk having information bits stored in a plurality of zones thereof, each zone having a bit period and frequency distinct from the other zones, information bits comprising a plurality of information characters, each character consisting of bits from each of the zones and wherein the bits of a single character and within a single zone comprise a byte, a synchronizing mark associated with and immediately preceding each byte in each zone, a plurality of shift registers each of the registers being associated with one of the zones, first means for recovering said synchronizing mark and its associated byte of information bits from a first one of said storage zones, a single clock track on said magnetic disk having a first frequency suitable for serially transferring bits from a first one only of said storage zones, means including clock track recovery means for deriving a first train of clock pulses of said frequency of said one only zone with each pulse in said first train having a pulse duration less than the bit period for that one only zone and the pulse being asynchronous with the binary bit locations stored in that zone on the magnetic disk, means connected to said clock train deriving means for emitting a plurality of auxiliary clock pulse trains of the same frequency as said first clock pulse train and being shifted relative to said first clock pulse train and relative to each other for defining sub-period intervals within each bit period for all bit periods of all of said zones, first comparison means including said first byte recovery means for sensing synchronization between said synchronizing mark and a pulse defining one of said sub-period intervals within one bit period for said first zone, first means connected to said sensing means and responsive in the next bit period for said first zone for selecting one pulse appearing at the sub-period interval immediately subsequent to the synchronization sub-period interval, and further for selecting thereafter each pulse in said same sub-period interval, said pulses so selected defining a first byte strobe train of the same bit period and frequency as said first zone and in synchronism with the binary bits of the byte for said first zone, first means connecting said shift register associated with said first storage zone to said first binary bit recovery means, and means applying said first byte strobe train to said first shift register for serially storing the bits of said first byte therein.

13. A digital data processing system in accordance with claim 12 and further comprising:

second means for recovering said synchronizing mark and its associated byte of information bits from a second one of said storage zones distinct from said first, second comparison means including said second byte recovery means for sensing synchronization between said synchronizing mark associated with said second byte and a pulse defining one of the sub-period intervals within one bit period for said second zone, second means connected to said second comparison means and responsive in the next bit period for said second zone following the synchronizing mark for selecting one pulse appearing at the sub-period interval immediately subsequent to the synchronization of said sub-period interval and further for selecting thereafter each pulse in said same sub-period interval, said pulses so selected defining a second byte strobe train of the same bit period and frequency as said second zone and in synchronism with the binary bits of the byte for said second zone, second connecting means connecting said shift register associated with said second zone to said second binary bit recovery means, and means applying said second byte strobe train to said second shift register for serially storing the bits of said byte therein simultaneously with storage of bits of the byte in said first shift register.

14. A system for timing the flow of data relative to storage media comprising:

a magnetic disk having information bits stored in at least two distinct data zones thereof, each data zone having a bit period and frequency distinct from the other zones, information bits comprising a plurality of information characters, each character consisting of bits from at least two zones wherein the bits of a character and within a single zone comprise a byte, a synchronizing mark associated with and immediately preceding a byte in each zone, a single clock track on said magnetic disk having a bit period and frequency the same as the bit period and frequency of one only of said data zones, timing means including means recovering said clock track and responsive thereto for emitting a plurality of recurring cycles of repetitive pulses for each zone, each cycle of repetitive pulses defining sub-period intervals within a period equal to the bit period of each zone, and each same ordered sub-period interval repetitively appearing in each cycle defining a clock pulse train of proper bit frequency for each zone, register means associated with each zone and responsive to clocking pulses applied thereto for recovering bits from its associated zone, means recovering said synchronizing marks immediately preceding a byte in each zone for selecting one repetitively appearing sub-period interval in each cycle for each zone which is in synchronism with the bits of the bytes of each zone respectively, and pulse train applying means connected between said timing means and said registers for applying a clocking pulse train to each register defined by the selected sub-period interval of the cycle associated with the data zone for recovering in synchronism bits from the zones associated with the registers.

15. A system in accordance with claim 14 wherein said timing means comprises:

means for emitting a plurality of auxiliary pulse phases each having a pulse occurrence frequency equal to the frequency of the single clock track, a phase-clocked ring counter for each zone, each ring counter having the same number of stages as the sub-period intervals for the recurring cycle of its respective zone.

a plurality of gating means for each bone, said gating means having said auxiliary pulse phases applied as inputs in a repetitive cycle for emitting a timing clock train of proper frequency for each zone when enabled, means connecting the ring counter stages for each zone to the plurality of gating means for its associated zone, said ring counter stages being operative for supplying a gate enabling signal to the plurality of gating means when cycling is stopped at a selected one of said sub-period intervals, and means connecting said sub-period interval selection means to said ring counter for stopping cycling of said counter at the sub-period interval selected thereby.

16. A digital data processing system comprising:

a storage media wherein a data segment is in the form of a plurality of groups of binary bits stored in a plurality of distinct zones of said media, said binary bits comprising a first bit group as part of the data segment and having a first predetermined period and frequency in a first distinct zone of the media, and a second bit group comprising another part of said data segment having a second predetermined period and frequency different from said first and stored in a second distinct zone of the media, the first binary bit in both said first and second bit groups being a synchronizing bit, and the first and second bit groups being asynchronous relative to each other, a master clock timing track on said media in the form of a plurality of binary bits having said first predetermined period and frequency, means for deriving from said master clock timing track a first train of clock pulses of said first predetermined period and frequency with one each of the clocking pulses comprising said first clocking train appearing once each period substantially at the beginning thereof with a pulse duration less than said bit period, a multi-phase clock including a first clock pulse train receiving means for emitting a plurality of auxiliary pulse trains having a pulse occurrence frequency equal to the frequency of the first clock pulse train and each auxiliary train being shifted relative to the first clock train and relative to each other for forming by the pulse durations of individual pulses thereof recurring sub-period intervals, a first given number of sub-period intervals defining the first predetermined period for said first storage zone, and a second given number of sub-period intervals defining the second predetermined period for said second storage zone, first means for recovering the synchronizing mark and binary bits of said first bit group from said first zone, first means including said first recovery means for sensing synchronization between said synchronizing mark of said first bit group and a pulse from any of the trains emitted by said multi-phase clock during any of said first given number of sub-period intervals, a first read strobe selection means connected between said multi-phase clock and said first sensing means and responsive to said synchronization of said first synchronizing means for selecting a pulse train of said first predetermined frequency having a pulse appearing in the first sub-period interval immediately following the sub-period interval during which said synchronization of said first synchronizing means occurred, a first shift register associated with said first zone and connected to said first recovery means for receiving the binary bits of said first bit group, means applying said read strobe pulse train of said first frequency to said first shift register for storing said first bit group therein, second means for recovering the synchronizing mark and the binary bits of said second bit group from said second zone, second means including said second recovery means for sensing synchronization between said synchronizing mark of said second group and a pulse from any of the trains emitted by said multi-phase clock during any of said second given number of sub-period intervals, a second read strobe selection means connected between said multi-phase clock and said second sensing means and responsive to said synchronization of said second synchronizing means for defining the first pulse appearing in the first sub-period interval immediately following the sub-period interval during which said synchronization of said second synchronizing means occurred, means responsive to said second read strobe selection means for emitting a gate enabling signal in each recurring sub-bit period of said second predetermined period defined by said second read strobe selection means, said second read strobe selection means comprising logic gating means receiving said pulse trains of said multi-phase clock, means applying said gate enabling signals to said logic means for repetitively enabling said logic gating means to pass selected pulses thereat defining a second read strobe pulse train of said second predetermined frequency, a second shift register associated with said second zone and connected to said second recovery means for receiving the binary bits of said second bit group, and means applying said second read strobe pulse train to said second shift register for storing said second bit group therein.

References Cited

UNITED STATES PATENTS

| | | | |
|---|---|---|---|
| 3,267,437 | 8/1966 | Harwood | 340—172.5 |
| 3,312,948 | 4/1967 | Capozzi | 340—172.5 |
| 3,331,060 | 7/1967 | Willis | 340—172.5 |

PAUL J. HENON, *Primary Examiner.*

R. RICKERT, *Assistant Examiner.*